United States Patent [19]
Perrotta et al.

[11] Patent Number: 5,919,724
[45] Date of Patent: Jul. 6, 1999

[54] PROCESS FOR MAKING PHOSPHATE STABILIZED METAL OXIDE PARTICLES

[75] Inventors: Anthony J. Perrotta, Monroeville; Randall B. Minnick, Lower Burrell, both of Pa.

[73] Assignee: Aluminum Company of America, Pittsburgh, Pa.

[21] Appl. No.: 09/035,360

[22] Filed: Mar. 5, 1998

[51] Int. Cl.$^6$ .............. B01J 31/06; B01J 27/14; B01J 27/16
[52] U.S. Cl. ............ 502/159; 502/208; 502/214; 502/349; 502/350; 502/351; 502/355
[58] Field of Search .................... 502/159, 208, 502/214, 349, 350, 351, 355

[56] References Cited

U.S. PATENT DOCUMENTS

| | | | |
|---|---|---|---|
| 4,657,880 | 4/1987 | Lachman et al. | 502/64 |
| 5,037,791 | 8/1991 | Comolli et al. | 502/185 |
| 5,039,644 | 8/1991 | Lachman et al. | 502/208 |
| 5,124,302 | 6/1992 | Lachman et al. | 502/213 |
| 5,182,016 | 1/1993 | Funkenbusch et al. | 502/182 |
| 5,633,217 | 5/1997 | Lynn | 502/439 |

*Primary Examiner*—Elizabeth D Wood
*Attorney, Agent, or Firm*—Glenn E. Klepac

[57] ABSTRACT

A method for making catalyst particles having improved resistance to surface area loss through thermal degradation. The particles are preferably metal oxide particles and more preferably alumina hydrate particles having a surface area of at least about 150 $m^2/g$. The particles are mixed with an organic monomer, preferably furfuryl alcohol. The monomer is polymerized to form polymer coated metal oxide particles. Thereafter, the polymer coated particles are treated with a phosphorus-containing acid or salt.

17 Claims, 1 Drawing Sheet

PROCESS FOR MAKING PHOSPHATE STABILIZED METAL OXIDE PARTICLES

FIELD OF THE INVENTION

The present invention relates to a process for making high surface area metal oxide particles suitable for use in catalyst applications.

BACKGROUND OF THE INVENTION

Metal oxide particles have long been used to make catalysts, and particularly catalyst supports. The useful metal oxides include alumina, silica, titania, zirconia, spinel, and mixtures thereof. One particularly useful metal oxide is gamma-alumina, especially gamma-alumina derived from boehmite or a boehmitic gel.

One of the problems encountered with high surface area metal oxide catalyst supports is that they lose surface area upon being heated to high temperatures, especially when moisture is present. In order to improve surface area retention at high temperatures, prior art workers have mixed alumina with transition metal oxides and rare earth metal oxides such as lanthanum oxide, barium oxide and ceria. Two other useful additives are silica and phosphates. The prior art additives generally suffer from an inability to stabilize metal oxide surface area upon heating to high temperatures on the order of about 1000° C., especially when the metal oxides are heated for several hours or more in the presence of moisture.

Silica and phosphate additions to alumina catalysts are known to retard surface area degradation upon heating. One problem with addition to alumina of high levels of silica and phosphate is interference with catalyst activity in finished catalysts made with the stabilized alumina.

Lachman et al U.S. Pat. Nos. 5,039,644 and 5,124,302 disclose monolithic catalyst supports made with porous metal oxide material stabilized by phosphate dispersed substantially throughout the metal oxide. The phosphate is said to stabilize the porous metal oxide material against thermal degradation during sintering or other exposure to elevated temperatures, thereby aiding retention of higher overall surface area. The present invention improves upon the methods and products disclosed by Lachman et al.

A principal objective of the present invention is to provide a method for making catalyst particles having improved resistance to loss of surface area by thermal degradation.

A related objective is to provide an improved catalyst product made by the method of the present invention.

Additional objectives and advantages of our invention will become apparent to persons skilled in the art from the following detailed description.

BRIEF DESCRIPTION OF THE DRAWING

The sole FIGURE is a graph showing surface area as a function of phosphate concentration.

SUMMARY OF THE INVENTION

Figure 1:
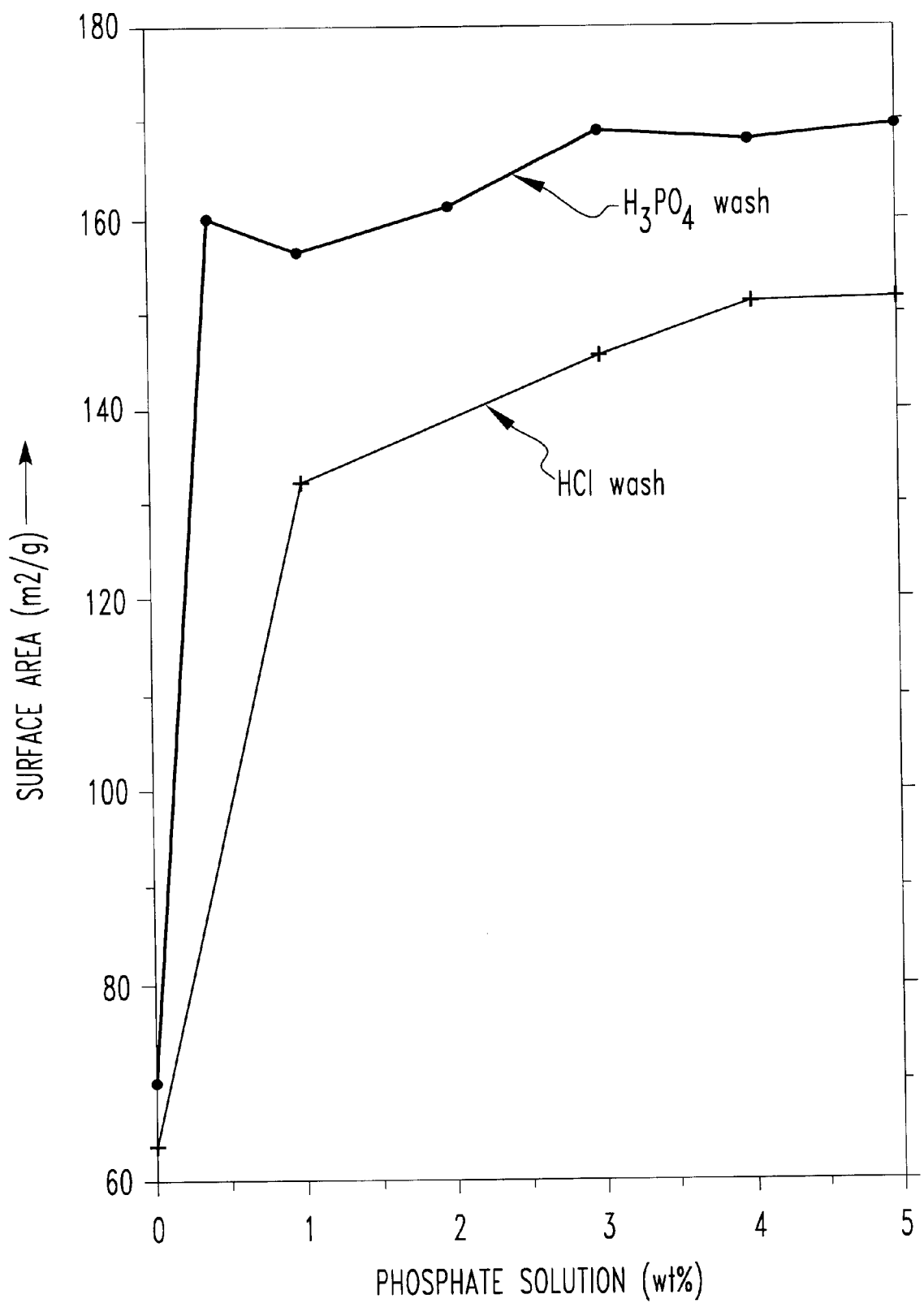

In accordance with the present invention, there is provided a method for making catalyst particles having improved resistance to surface area loss through thermal degradation.

The particles of the invention contain a metal oxide, preferably alumina and more preferably alumina hydrate. As used herein, the term "alumina hydrate" refers to $Al_2O_3 \cdot xH_2O$ wherein x varies from 1 to 3 and the water of hydration is between 15.0 and 34.6 percent by weight of the alumina hydrate. Alumina hydrate suitable for practice of the present invention is preferably alumina trihydrate derived from a monohydrate gel or pseudogel. Other suitable metal oxides include silica, titania, zirconia, spinel, and mixtures of the aforementioned metal oxides.

One important property of metal oxide particles used in making catalyst supports is high surface area. As used herein, the term "high surface area" means that the metal oxide particles have a surface area of at least about 150 $m^2/g$. The surface area is preferably at least about 200 $m^2/g$ and more preferably at least about 250 $m^2/g$. The particles have a median size in the range of about 1–100 microns, preferably about 10–30 microns.

The particles are initially treated with an acid, preferably phosphoric acid in aqueous solution that is vibrated at an ultrasonic frequency to reduce treatment time. The acid-treated particles are mixed with an organic monomer, preferably furfuryl alcohol. The particles are preferably sonicated during mixing with the monomer.

The monomer-treated particles are filtered, then dried by heating in air to an elevated temperature that is preferably about 110° C. Heating polymerizes the furfuryl alcohol, resulting in polymer coated metal oxide particles. The coated particles are then treated with a phosphorus-containing acid or acid salt. Some suitable acids include phosphoric acid and phosphorous acid. Useful salts include ammonium phosphate, ammonium monohydrogen phosphate, ammonium dihydrogen phosphate, metal phosphates and various organophosphates. We utilized ammonium dihydrogen phosphate, $NH_4H_2PO_4$, in a particularly preferred embodiment.

The phosphate treated particles are heated in air to oxidize the polymer. Heating to 475° C. for 8 hours was quite suitable in a preferred embodiment.

In its broadest aspect, the process of the present invention is useful for making catalyst particles having improved resistance to loss of surface area by thermal degradation, and comprises the following steps:

(a) mixing high surface area metal oxide particles with an organic monomer;

(b) heating the particles to polymerize the monomer, thereby to form polymer coated metal oxide particles; and (c) treating the polymer coated metal oxide particles with a phosphorus-containing acid or a salt thereof.

DETAILED DESCRIPTION OF PREFERRED EMBODIMENTS

Gamma alumina trihydrate is prepared by hydrolyzing alumina monohydrate with an acidic solution. A particularly preferred alumina monohydrate is sold by Aluminum Company of America of Pittsburgh, Pa. under the trademark HI Q ALUMINA. The gamma alumina trihydrate powder has a surface area of about 283 $m^2/g$ after firing at 495° C. for 2.5 hours.

The alumina powder is first treated with an aqueous acid solution made by dissolving 1.8 g of phosphoric acid in 398.7 g water. The solution has a pH of about 2.0. Adding 2 g of the alumina to 130 ml of the solution produced a slurry having a pH of about 2.2. The slurry was sonicated at 20 KHz for 2 minutes, raising its temperature to 55° C.

The slurry was filtered to remove most of the acid solution, and the filter cake was added to 40 ml of furfuryl alcohol having a pH of about 4.2. The treated alumina powder dispersed readily, forming a slurry that was sonicated for 4 minutes at 20 KHz with a 50% duty cycle, raising the temperature to 75° C. Filtration of the slurry yielded an alumina cake that was dried at 110° C. in air. The product weighed 2.50 g.

A set of experiments was performed on specimens of gamma alumina trihydrate treated with 0.45 wt. % phosphoric acid and furfuryl alcohol as described above, with and without sonication. For comparison, a standard was untreated with either phosphoric acid or furfuryl alcohol. Initial surface area was 283 m$^2$/g. Surface area retention was measured after heating to 1000° C. in air for 24 hours. Results of the tests are shown in Table 1.

TABLE 1

Surface Area Retention

| Specimen | Phosphoric Acid | Furfuryl Alcohol | Surface Area m$^2$/g |
|---|---|---|---|
| Standard | — | — | 55 |
| 1 | No sonication | No sonication | 149 |
| 2 | Sonication | No sonication | 166 |
| 3 | Sonication | Sonication | 166 |

These tests show substantially improved performance for the specimens treated with both phosphoric acid and furfuryl alcohol, compared with the untreated standard. Sonication during the phosphoric acid treatment also increased surface area retention.

A second set of experiments was performed on gamma alumina trihydrate powder specimens that were washed with either phosphoric acid or hydrochloric acid before treatment with furfuryl alcohol and then an ammonium dihydrogen phosphate solution. The phosphoric acid and hydrochloric acid solutions both had a pH of 2. The furfuryl alcohol treatment included polymerization by drying in air at 110° C. The ammonium dihydrogen phosphate solutions had concentrations ranging from 0 to 5 wt. %. All of the specimens were dried at 110° C. and then fired at 1000° C. in air for 24 hours. Surface areas of the fired specimens are shown in FIG. 1. Best results were achieved with a phosphoric acid washed followed by furfuryl alcohol polymerization and then treatment with 3 wt. % or more of the ammonium dihydrogen phosphate.

A third set of experiments was performed on gamma alumina trihydrate specimens that were washed with a pH/2 phosphoric acid solution and filtered; treated with furfuryl alcohol and then polymerized by drying at 110° C.; treated with a 5 wt. % ammonium dihydrogen phosphate solution for 10 minutes; and dried. The specimens were fired at 1000° C. in air for 24 hours and then exposed to a 12 vol. % steam atmosphere for 24 hours. Surface areas were measured after firing at 1000° C. in air and also after steaming. Results are shown in Table 2.

TABLE 2

Surface Area Retention

| Sample | Surface Area After Firing (m$^2$/g) | Surface Area After Steaming (m$^2$/g) |
|---|---|---|
| 1 | 160 | 146 |
| 2 | 169 | 159 |
| 3 | 168 | 158 |
| 4 | 169 | 157 |

TABLE 2-continued

Surface Area Retention

| Sample | Surface Area After Firing (m$^2$/g) | Surface Area After Steaming (m$^2$/g) |
|---|---|---|
| 5 | 167 | 141 |
| 6 | 164 | 144 |
| 7 | 166 | 154 |
| 8 | 166 | 149 |

The results in Table 2 show excellent surface area retention for specimens treated in accordance with the present invention even after exposure to steam for 24 hours.

Having described the presently preferred embodiments, it is to be understood that the invention may be otherwise embodied within the spirit and scope of the appended claims.

What is claimed is:

1. A process for making catalyst particles having improved resistance to loss of surface area by thermal degradation, comprising (a) mixing high surface area metal oxide particles with an organic monomer;

(b) heating the particles to polymerize the monomer, thereby to form polymer coated metal oxide particles; and (c) treating the polymer coated metal oxide particles with a phosphorus-containing acid or a salt thereof.

2. The process of claim 1 wherein said monomer is furfuryl alcohol.

3. The process of claim 1 wherein said particles comprise a metal oxide selected from the group consisting of alumina, silica, titania, zirconia, spinel, and mixtures thereof.

4. The process of claim 1 wherein said particles comprise gamma alumina.

5. The process of claim 4 wherein the gamma alumina in said particles is derived from boehmite or a boehmitic gel.

6. The process of claim 1 wherein said particles comprise alumina and have a surface area of at least about 150 m$^2$/g.

7. The process of claim 1 wherein said particles have an average size of less than about 100 microns.

8. The process of claim 1 wherein said acid or salt comprises ammonium dihydrogen phosphate.

9. The process of claim 1 further comprising heating the acid or salt treated particles in an atmosphere containing oxygen to oxidize the polymer.

10. The process of claim 1 wherein the step of mixing the metal oxide particles and the monomer includes ultrasonically agitating said particles.

11. The process of claim 1 wherein the step of treating the polymer coated metal oxide particles with an acid or salt includes ultrasonically agitating said particles.

12. In a process wherein porous alumina hydrate particles are treated with phosphoric acid or a salt thereof in order to improve resistance to thermal degradation of surface area, the improvement comprising:

(a) mixing furfuryl alcohol with porous alumina hydrate particles;

(b) heating the particles to polymerize the furfuryl alcohol and to form a polymer coating on the alumina hydrate particles; and (c) thereafter, treating the polymer coated particles with phosphoric acid or a salt thereof.

13. The process of claim 12 further comprising:
(d) heating the particles in an atmosphere containing oxygen to oxidize the polymer.

14. The process of claim 12 further comprising:
(e) ultrasonically agitating the alumina hydrate particles in step (a).

15. The process of claim 1 further comprising:
(f) ultrasonically agitating the alumina hydrate particles in step (c).

16. Catalyst particles having improved resistance to loss of surface area by thermal degradation, said catalyst particles comprising metal oxide particles made by the process of claim 9.

17. Alumina particles having improved resistance to loss of surface area by thermal degradation, said alumina particles being made by the process of claim 13.

* * * * *